(12) United States Patent
Collart et al.

(10) Patent No.: US 9,684,142 B2
(45) Date of Patent: Jun. 20, 2017

(54) RAPID DISTRIBUTION TERMINAL

(71) Applicant: TYCO ELECTRONICS RAYCHEM BVBA, Kessel-Lo (BE)

(72) Inventors: Stephane Collart, Olen (BE); David Jan Irma Van Baelen, Winksele (BE); Samuel Leeman, Kessel-Lo (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 73 days.

(21) Appl. No.: 14/441,393

(22) PCT Filed: Nov. 7, 2013

(86) PCT No.: PCT/EP2013/073206
§ 371 (c)(1),
(2) Date: May 7, 2015

(87) PCT Pub. No.: WO2014/072368
PCT Pub. Date: May 15, 2014

(65) Prior Publication Data
US 2015/0309276 A1 Oct. 29, 2015

Related U.S. Application Data

(60) Provisional application No. 61/723,646, filed on Nov. 7, 2012.

(51) Int. Cl.
*G02B 6/44* (2006.01)
(52) U.S. Cl.
CPC ......... *G02B 6/4446* (2013.01); *G02B 6/4452* (2013.01); *G02B 6/4455* (2013.01);
(Continued)

(58) Field of Classification Search
None
See application file for complete search history.

(56) References Cited

U.S. PATENT DOCUMENTS

| 7,400,814 B1 | 7/2008 | Hendrickson et al. |
| 7,522,806 B2 | 4/2009 | Hendrickson et al. |

(Continued)

FOREIGN PATENT DOCUMENTS

| EP | 2 159 618 | 3/2010 |
| WO | WO 2011/146722 | 12/2011 |
| WO | WO 2011/156969 | 12/2011 |

OTHER PUBLICATIONS

International Search Report for International Application No. PCT/EP2013/073206 mailed May 2, 2014 (5 pages).

*Primary Examiner* — Tina Wong
(74) *Attorney, Agent, or Firm* — Merchant & Gould P.C.

(57) ABSTRACT

A fiber distribution terminal (30, 130, 230) including a housing (131, 231); and a spool arrangement (136, 236) that can rotate relative to the housing about an axis of rotation. The spool arrangement includes a drum portion (142, 242) centered on the axis of rotation and a flange (144, 146, 244, 246) that rotates with the drum portion about the axis of rotation. A fiber optic cable (40) is coiled on the drum portion. A fiber optic adapter (164, 264) and a connectorized pigtail (160, 260) are carried with the flange and positioned within the housing. The spool arrangement (136, 236) rotates relative to the housing when the fiber optic cable (40) is paid out. The drum portion (142, 242) can be removed from the flange after the fiber optic cable has been paid out to provide the distribution terminal with a compact configuration.

15 Claims, 13 Drawing Sheets

(52) U.S. Cl.
CPC ......... *G02B 6/4457* (2013.01); *G02B 6/4458* (2013.01); *G02B 6/4471* (2013.01)

(56) References Cited

U.S. PATENT DOCUMENTS

| | | | |
|---|---|---|---|
| 7,546,018 | B2 | 6/2009 | Hendrickson et al. |
| 7,715,679 | B2 | 5/2010 | Kowalczyk et al. |
| 7,748,660 | B2 | 7/2010 | Hendrickson et al. |
| 7,756,379 | B2 | 7/2010 | Kowalczyk et al. |
| 7,869,682 | B2 | 1/2011 | Kowalczyk et al. |
| 7,894,701 | B2 | 2/2011 | Kowalczyk et al. |
| 8,131,126 | B2 | 3/2012 | Kowalczyk et al. |
| 8,189,984 | B2 | 5/2012 | Kowalczyk et al. |
| 8,229,267 | B2 | 7/2012 | Kowalczyk et al. |
| 8,265,447 | B2 | 9/2012 | Loeffelholz et al. |
| 8,380,035 | B2 | 2/2013 | Kowalczyk et al. |
| 8,494,333 | B2 | 7/2013 | Kowalczyk et al. |
| 8,494,334 | B2 | 7/2013 | Kowalczyk et al. |
| 8,705,929 | B2 | 4/2014 | Kowalczyk et al. |
| 8,774,588 | B2 | 7/2014 | Kowalczyk et al. |
| RE45,153 | E | 9/2014 | Hendrickson et al. |
| 8,891,931 | B2 | 11/2014 | Kowalczyk et al. |
| 9,036,974 | B2 | 5/2015 | LeBlanc et al. |
| 9,057,860 | B2 | 6/2015 | Kowalczyk et al. |
| 9,063,316 | B2 | 6/2015 | Loeffelholz et al. |
| 9,188,760 | B2 | 11/2015 | Kowalczyk et al. |
| 9,229,185 | B2 | 1/2016 | Kowalczyk et al. |
| 9,261,663 | B2 * | 2/2016 | Loeffelholz .......... G02B 6/4453 |
| 9,261,666 | B2 | 2/2016 | Kowalczyk et al. |
| 9,417,417 | B2 | 8/2016 | Loeffelholz et al. |
| 9,523,834 | B2 | 12/2016 | Kowalczyk et al. |
| 2009/0074370 | A1 * | 3/2009 | Kowalczyk .......... G02B 6/4441 385/135 |
| 2009/0317047 | A1 | 12/2009 | Smith et al. |
| 2011/0311226 | A1 | 12/2011 | Smith et al. |
| 2011/0317974 | A1 | 12/2011 | Krampotich et al. |
| 2012/0025005 | A1 | 2/2012 | Smith et al. |
| 2013/0209049 | A1 * | 8/2013 | Kowalczyk .......... G02B 6/4457 385/135 |
| 2015/0063770 | A1 | 3/2015 | Kowalczyk et al. |
| 2015/0286023 | A1 | 10/2015 | Van Baelen et al. |
| 2016/0025946 | A1 | 1/2016 | Kowalczyk et al. |
| 2016/0161693 | A1 | 6/2016 | Loeffelholz et al. |
| 2016/0187607 | A1 | 6/2016 | Kowalczyk et al. |
| 2016/0223771 | A1 | 8/2016 | Kowalczyk et al. |

* cited by examiner

RAPID DISTRIBUTION TERMINAL

This application is a National Stage Application of PCT/EP2013/073206, filed 7 Nov. 2013, which claims benefit of U.S. Provisional Ser. No. 61/723,646, filed 7 Nov. 2012 and which applications are incorporated herein by reference. To the extent appropriate, a claim of priority is made to each of the above disclosed applications.

BACKGROUND

As demand for telecommunications increases, fiber optic networks are being extended in more and more areas. In facilities such as multiple dwelling units (MDU's), apartments, condominiums, businesses, etc., fiber optic distribution terminals are used to provide subscriber access points to the fiber optic network. Fiber optic distribution terminals are often installed at separate floors of an MDU and are connected to the fiber optic network through cables connected to a network hub. The length of cable needed between the fiber optic enclosure and the network hub varies depending upon the location of the fiber optic enclosure with respect to the network hub. As a result, there is a need for a fiber optic enclosure that can effectively manage varying lengths of cable. Cables are also used to interconnect the subscriber access points provided by the fiber distribution terminals with subscriber interface units (e.g., Optical Network Terminals) provided at subscriber locations (e.g., at each residence of an MDU). With respect to such fiber distribution systems, there is also a need for techniques to effectively managing excess cable length while also taking into consideration space constraints.

SUMMARY

One aspect of the present disclosure relates to a fiber distribution device including a spool arrangement about which a length of fiber optic cable is coiled. The fiber optic cable includes at least one optical fiber contained within a cable jacket. The fiber distribution device also includes a plurality of fiber optic adapters each configured for mechanically and optically coupling together two fiber optic connectors. By way of example, each fiber optic adapter can include a first port for receiving a first fiber optic connector and a second port for receiving a second fiber optic connector. The first and second fiber optic connectors are held in a co-axially aligned relationship when mounted within the first and second ports of a fiber optic adapter. The fiber optic adapters and the spool arrangement are configured such that the fiber optic adapters and the spool arrangement rotate together in unison about an axis of rotation as the fiber optic cable is paid off from the spool arrangement. In one example, the fiber optic adapters are mounted on a flange of the spool arrangement. In another example, the flange forms a fiber management tray including one or more fiber routing paths. The fiber distribution device also can include an optical splitter (e.g., a passive optical power splitter, a wavelength division multi-plexer, etc.) that couples a first end of the optical fiber of the fiber optic cable coiled around the spool arrangement to a plurality of connectorized fiber optic pigtails. The fiber optic pigtails have connectorized ends that plug into the first ports of the fiber optic adapters. The optical splitter and the fiber optic pigtails can be carried with the spool assembly and the fiber optic adapters as the spool assembly is rotated about the axis of rotation. A second end of the fiber optic cable can be connectorized. By paying out the fiber optic cable from the spool assembly, the fiber optic cable can be routed to a terminal, such as a fiber distribution hub, where the second end of the fiber optic cable can be optically connected to an optical fiber connected to a service provider (e.g., a central office). Patch cords having first and second connectorized ends can be used to connect subscribers to the service provider through the fiber distribution device. In one example, the first connectorized ends of the patch cords can be plugged into the second ports of the fiber optic adapters of the fiber optic distribution device and the second connectorized ends of the patch cords can be connected to optical network terminals at the subscriber locations.

Another aspect of the present disclosure relates to a fiber distribution device including a spool arrangement about which a length of fiber optic cable is coiled. The fiber optic cable includes at least one optical fiber contained within a cable jacket. The fiber distribution device also includes a plurality of fiber optic adapters each configured for mechanically and optically coupling together two fiber optic connectors. By way of example, each fiber optic adapter can include a first port for receiving a first fiber optic connector and a second port for receiving a second fiber optic connector. The first and second fiber optic connectors are held in a co-axially aligned relationship when mounted within the first and second ports of a fiber optic adapter. The fiber optic adapters and the spool arrangement are configured such that the fiber optic adapters and the spool arrangement rotate together in unison about an axis of rotation as the fiber optic cable is paid off from the spool arrangement. In one example, the fiber optic adapters are mounted on a flange of the spool arrangement. In another example, the flange forms a fiber management tray including one or more fiber routing paths. The fiber distribution device also can include an optical splitter (e.g., a passive optical power splitter, a wavelength division multi-plexer, etc.) that couples a first end of the optical fiber of the fiber optic cable coiled around the spool arrangement to a plurality of connectorized fiber optic pigtails. Alternatively, the fiber optic cable can include a plurality of optical fibers that are fanned out into connectorized fiber optic pigtails at the fiber optic distribution device. The fiber optic pigtails have connectorized ends that plug into the first ports of the fiber optic adapters. The optical splitter or the fan out along with the fiber optic pigtails can be carried with the spool assembly and the fiber optic adapters as the spool assembly is rotated about the axis of rotation. A second end of the fiber optic cable can be connectorized. By paying out the fiber optic cable from the spool assembly, the fiber optic cable can be routed to a terminal, such as a fiber distribution hub, where the second end of the fiber optic cable can be optically connected to one or more optical fibers connected to a service provider (e.g., a central office). Patch cords having first and second connectorized ends can be used to connect subscribers to the service provider through the fiber distribution device. In one example, the first connectorized ends of the patch cords can be plugged into the second ports of the fiber optic adapters of the fiber optic distribution device and the second connectorized ends of the patch cords can be connected to optical network terminals at the subscriber locations.

In one example, the spool assembly includes a drum portion about which the fiber optic cable is coiled. To provide flexibility in storing excess cable length, in one example, at least the drum portion of the spool assembly can be removed from a remainder of the fiber distribution device after deployment to allow excess cable to be stored at a location offset from the remainder of the fiber distribution device.

In one example, the spool assembly includes a front flange spaced from a rear flange along an axis defined by the drum portion. In one example, the spool assembly, the adapters, the pigtails, and the splitter or the fan-out are enclosed in a housing relative to which the spool assembly can rotate about the axis of rotation. In one example, the housing includes a main housing body, a front cover and a rear cover. In one example, the main housing body and the front cover cooperate to define a front compartment and the main housing body and the rear cover cooperate to define a rear compartment. In one example, the front flange of the spool assembly is positioned within the front compartment and the rear flange of the spool assembly is positioned in the rear compartment. In one example, the rear flange, a majority of the drum, and the coiled fiber optic cable are contained in the rear compartment. In one example, the fiber optic adapters, the fiber optic pigtails, and the splitter or the fan-out are supported by or otherwise carried with the front flange. In one example, at least the drum portion is removable from the main housing body to allow excess fiber optic cable to be stored remotely from the main housing body. In one example, at least the drum portion and the rear flange are movable together as a unit from the main housing body to allow excess fiber optic cable to be stored remotely from the main housing body. In one example, at least the drum portion, the rear cover, and the rear flange are movable together as a unit from the main housing body to allow excess fiber optic cable to be stored remotely from the main housing body. In one example, the main housing body and the front cover can contain the fiber optic adapters, the fiber optic pigtails, and the splitter or the fan-out after the rear cover, the drum portion, and the rear flange have been detached; and the main housing body and the front cover can be mounted to a wall without the rear cover, the drum, the excess optical cable, or the rear flange to effectively use limited space. In one example, the drum with the excess fiber optic cable can be stored within a wall, within a plenum, within a riser, or at another location offset from the front compartment of the housing of the fiber distribution device. In one example, the drum, the rear flange, and the rear cover are removed from the main housing body while the front flange of the spool assembly remains within the front compartment. In one example, the rear flange and the drum portion about which excess fiber optic cable is coiled are detached as a unit from the front flange which remains in the front compartment of the housing. In one example, the coiled excess fiber optic cable can be removed from the drum portion for storage and the drum portion and/or the rear flange can be discarded.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
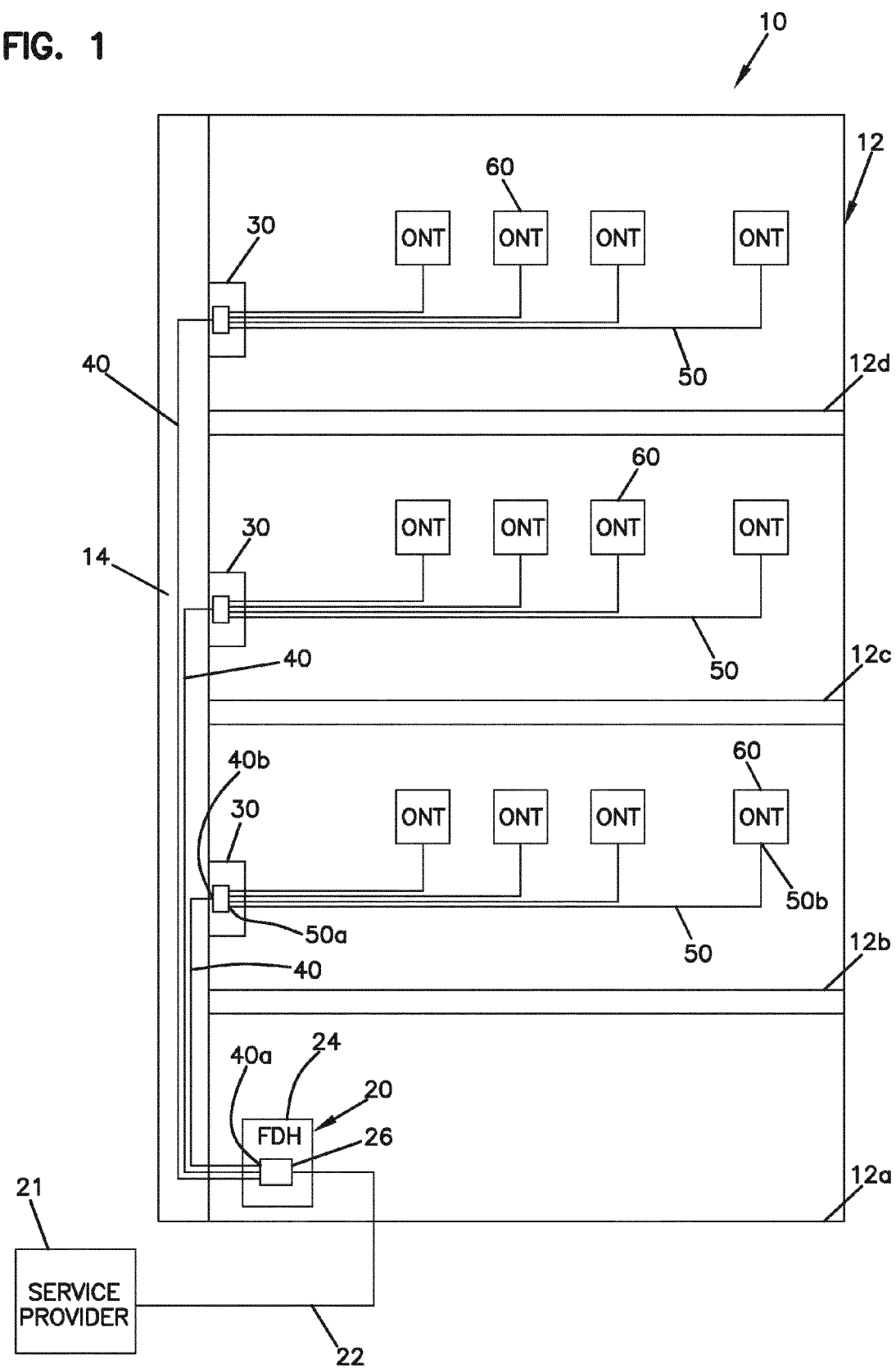
FIG. 1 is a schematic view of a fiber optic distribution system in accordance with the principles of the present disclosure shown incorporated into a multi-dwelling unit.
Figure 2:
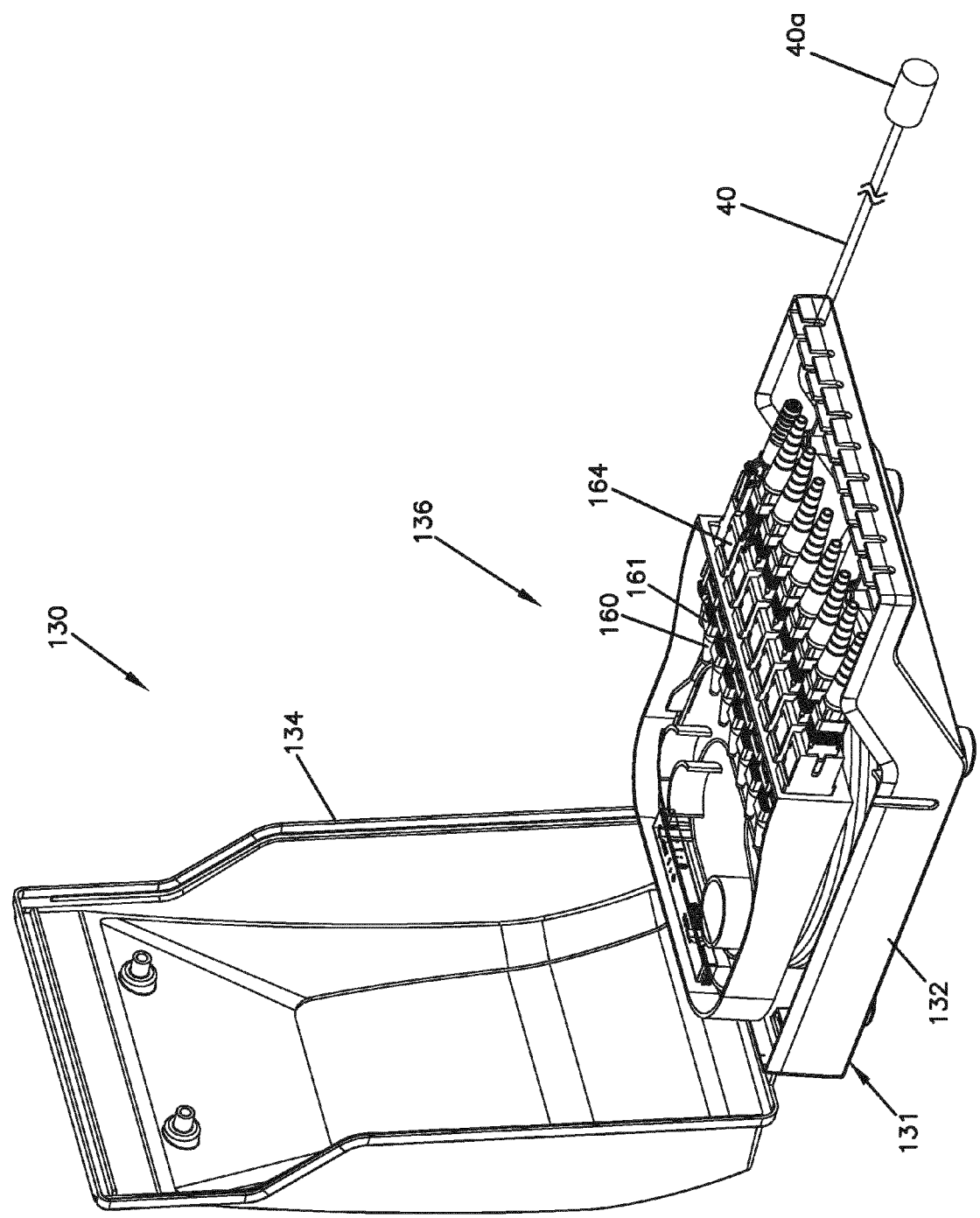
FIG. 2 is a perspective view of a fiber optic distribution terminal suitable for use in the fiber distribution system of FIG. 1.

Referring to FIG. 1, an example fiber optic distribution system 10 in accordance with the principles of the present disclosure is shown. The fiber optic distribution system 10 is shown incorporated into a building, such as a multi-dwelling unit (MDU) 12, having multiple floors 12a, 12b, 12c and 12d (i.e., multiple levels). The floor 12a can be a basement. A riser 14 can run between the various floors 12a-12d. While depicted in an MDU, it will be appreciated that the fiber distribution system 10 can be used in other types of buildings and other types of applications.

The fiber distribution system 10 is shown including a fiber distribution hub 20 installed at the floor 12a (e.g., typically in the basement or lowest floor of the building). The fiber distribution hub 20 is shown receiving at least one feed fiber 22 routed from a service provider 21 (e.g., from a central office of a service provider). The fiber distribution hub 20 can include a housing 24 that encloses one or more optical splitters 26. The optical splitter 26 can be configured to split optical signals supplied to the fiber distribution hub 20 by the feed fiber 22. Outputs of the optical splitter 26 can be optically connected to optical fibers routed to the various floors 12b-12d of the building. The housing 24 can also enclose various structures for making optical connections between optical fibers of optical cables. For example, the housing can include a plurality of fiber optic adapters for connecting fiber optic connectors, splice trays for protecting optical splices between optical fibers, or other types of structures.

The fiber distribution system 10 is shown including fiber distribution terminals 30 at each of the upper floors 12b-12d. Fiber optic cables 40 interconnect the fiber distribution hub 20 and the fiber distribution terminals 30. The fiber optic cables 40 can each include one or more optical fibers contained within a protective jacket. The optical fibers of the fiber optic cables 40 can be optically coupled to the feed fiber 22 through the optical splitter 26. If the fiber optic cables 40 contain single optical fibers, optical splitters can be provided in each of the fiber distribution terminals 30 for splitting signals carried by the optical fibers of the fiber optic cables 40. The optical splitters at the fiber distribution terminals 30 can optically connect the optical fibers of the fiber optic cables 40 to connectorized pigtails housed within the fiber distribution terminals 30. In one example, the optical splitters can provide a split ratio of at least 4 to 1. Fiber optic adapters within the fiber distribution terminals 30 can be used to optically connect the connectorized pigtails to patch cords 50 routed horizontally along the floors 12b-12d from the fiber distribution terminals 30 to optical network terminals (ONT's) 60 or other types of interface devices (e.g., an interface box, an interface panel, etc.) corresponding to different subscriber locations (e.g., apartments, residences, offices, condominiums, etc.) on each floor 12a-12d. An ONT 60 is an active device that converts optical signals from the service provider to electrical signals used at the subscriber locations. The patch cords 50 can include first and second connectorized ends 50a, 50b. The first connectorized ends 50a can be optically connected to the connectorized pigtails within the fiber distribution terminals 30 by fiber optic adapters within the fiber distribution terminals 30. The second connectorized ends 50b of the patch cords 50 can be coupled to the ONT's 60.

In other examples, the fiber optic cables 40 can each include a plurality of optical fibers that are optically connected to the feed fiber 22. For such examples, the fiber distribution terminals 30 can include fan-out devices (e.g., fan-out modules) that separate the optical fibers the fiber optic cables 40 routed to each fiber distribution terminal 30 into a plurality of connectorized pigtails that can be optically connected to subscriber locations via patch cords 50 as described above. The ends of the fiber optic cables 40 that interface with the fiber distribution hub 20 can be terminated with multi-fiber fiber optical connectors. In this type of example, all of the optical splitting of the building can be accomplished at the fiber distribution hub 20. In contrast, the previous example uses a distributed optical splitting strategy where optical splitting can occur at the fiber distribution terminals 30 and/or at each floor 12b-12d.

Figure 3:
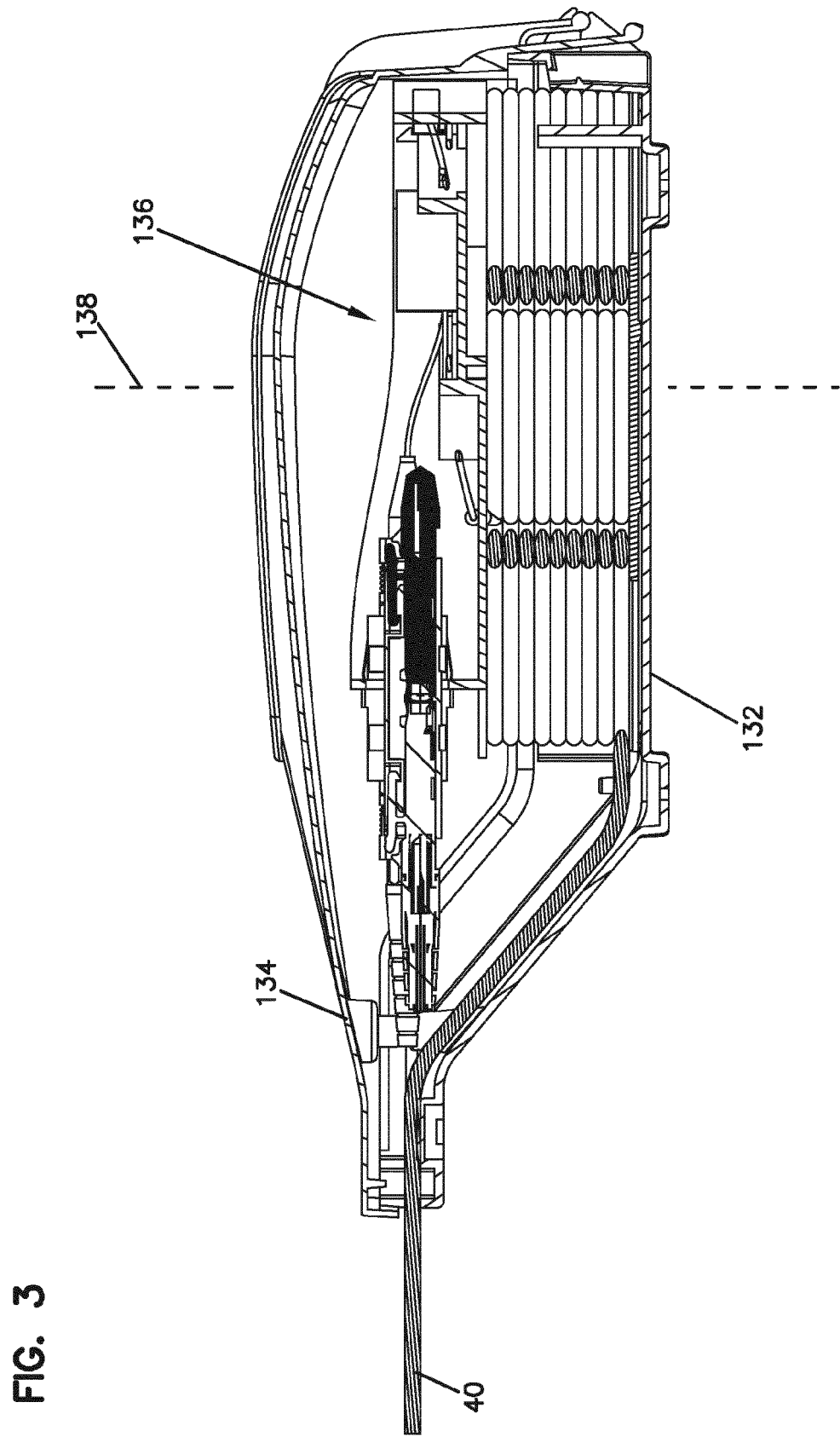
FIG. 3 is a cross-sectional view of the fiber distribution terminal of FIG. 2. relative to a base.

FIGS. 2-5 show an example fiber distribution terminal 130 that is one example of a configuration for the fiber distribution terminals 30 of FIG. 1. The fiber distribution terminal 130 includes a housing 131 having a base 132 and a front cover 134. The front cover 134 is movable (e.g., pivotally moveable) relative to the base 132 between an open position (see FIG. 2) and a closed position (see FIG. 3). The fiber distribution terminal 130 also includes a spool arrangement 136 positioned within housing 131. The spool arrangement 136 can rotate relative to the housing 131 about an axis of rotation 138 (FIG. 3). The spool arrangement 136 can be rotatably mounted on a spindle 139 coupled to the base 132 and aligned along the axis of rotation 138 (See FIG. 4).

Figure 4:
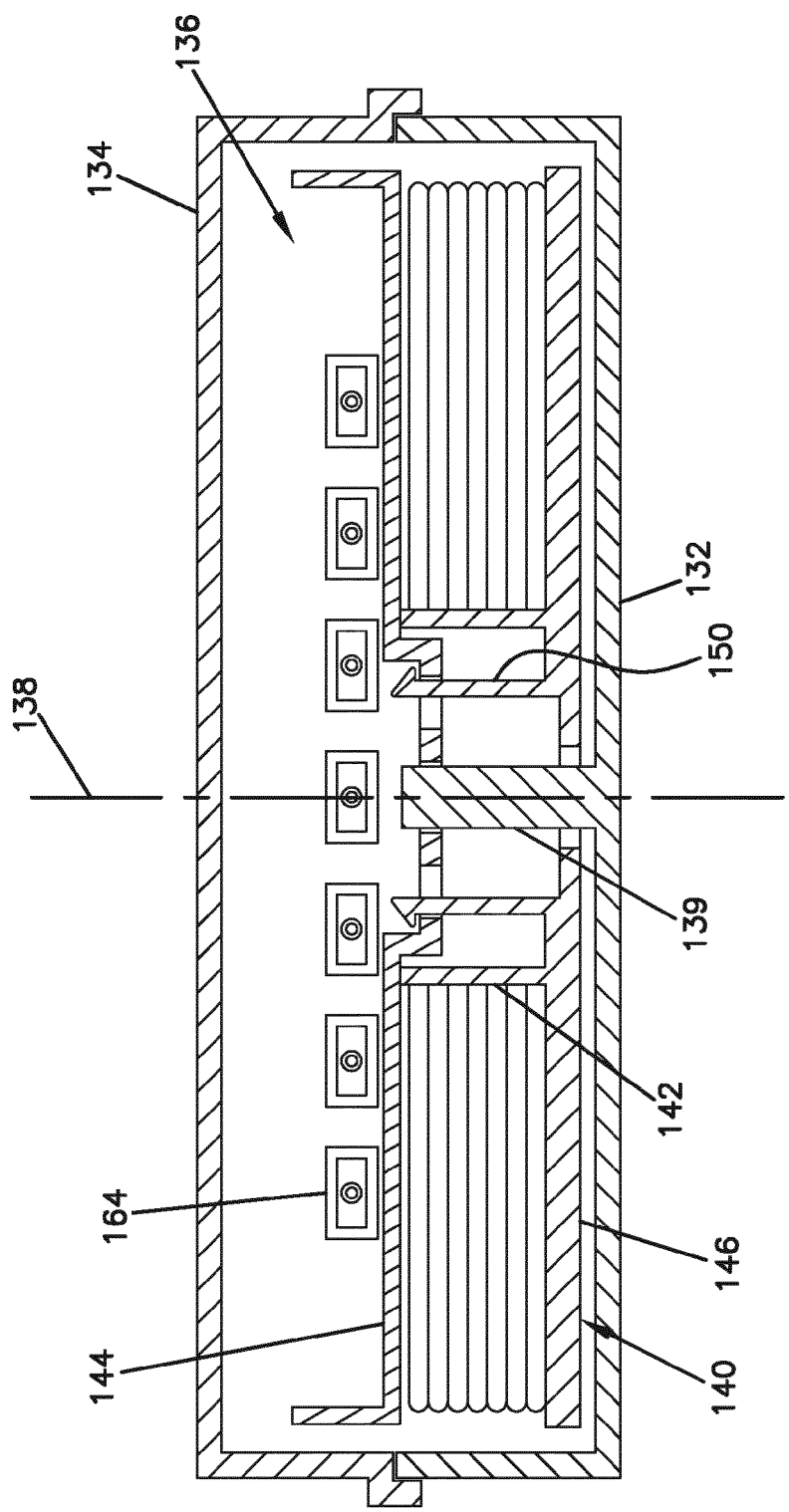
FIG. 4 is another cross-sectional view of the fiber distribution terminal of FIG. 2.
Figure 5:
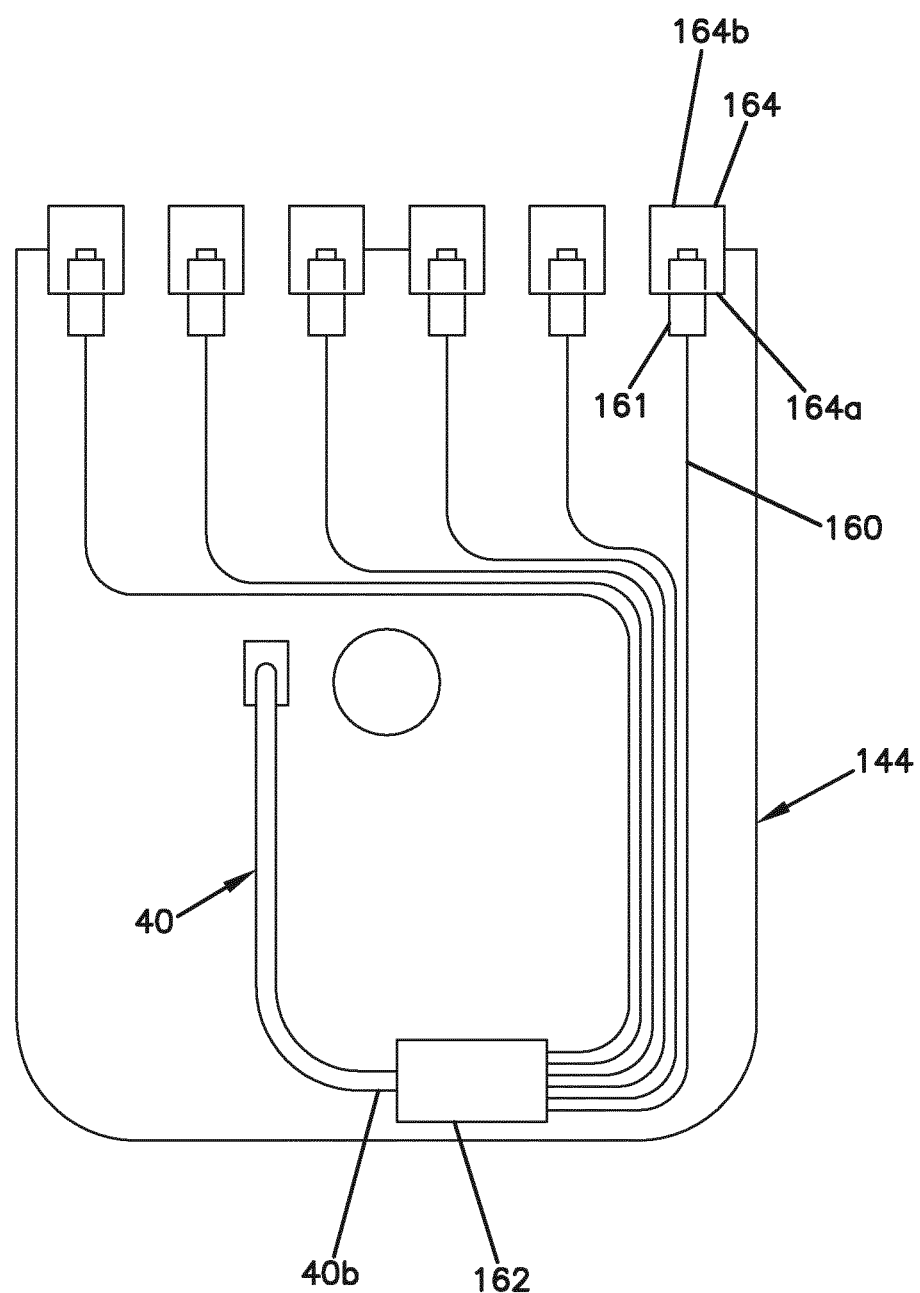
FIG. 5 is a plan view of a tray of the fiber distribution terminal of FIG. 2.

Referring to FIG. 4, the spool arrangement 136 includes a spool 140 having a drum portion 142 about which the fiber optic cable 40 is coiled. The spool arrangement 136 also includes a front flange 144 and a rear flange 146 between which the fiber optic cable 40 is coiled on the drum portion 142. The front and rear flanges 144, 146 are separated from one another along the axis of rotation 138. In the depicted example, the drum portion 142 is integrally formed with the rear flange 146 so as to form a one-piece part/unit. In the depicted example, the drum portion 142 and the rear flange 146 are coupled to the front flange 144 by a snap-fit connection. For example, flexible latches 150 are shown providing a snap-fit connection between the front flange 144 and the rear flange 146.

In one example, the fiber optic cable 40 can include a single optical fiber and can include a first end 40a (FIG. 1) that is connectorized by a single fiber optical connector (e.g., an SC connector, and LC connector, etc.). The first end 40a of the fiber optic cable 40 can be routed to the fiber distribution hub 20 for connection to the feed fiber 22. A second end 40b of the fiber optic cable 40 can be optically connected to a plurality of connectorized pigtails 160 via an optical splitter 162 (see FIG. 5). The front flange 144 can form a fiber management tray having fiber routing paths defined by one or more structures for providing fiber bend radius protection. A plurality of fiber optic adapters 164 can be supported on and carried by the front flange 144. The fiber optic adapters 164 can each include first and second ports 164a, 164b. The splitter 162 can be supported on and carried by the front flange 144. The connectorized pigtails 160 can have connectorized ends 161 received in the first ports 164a of the fiber optic adapters 164. The connectorized pigtails 160 can be routed along the front side of the front flange 144 from the splitter 162 to the fiber optic adapters 164.

To deploy the fiber distribution terminal 130, the terminal 130 is positioned at the desired floor 12b-12d and the fiber optic cable 40 is paid off from the spool arrangement 136 by pulling on the first end 40a of the fiber optic cable 40. The first end 40a of the fiber optic cable 40 is pulled down the riser 14 to the fiber distribution hub 20. As the fiber optic cable 40 is paid off from the spool arrangement 136, the spool arrangement 136 rotates relative to the housing 131 about the axis of rotation 138 defined by the spindle 139. The fiber optic adapters 164, the connectorized pigtails 160, and the optical splitter 162 are carried with the spool arrangement 136 and rotate in unison with (i.e., in concert with) the spool arrangement 136 about the axis of rotation 138 as the fiber optic cable 40 is paid off from the spool arrangement 136. After the cable 40 has been connected to the fiber distribution hub 20, the patch cords 50 can be used to connect the ONT's 60 to the fiber distribution terminal 130. For example, the first ends 50a of the patch cords 50 can be inserted into the second ports 164b of the fiber optic adapters 164. After deployment of the fiber distribution terminal 130, any remaining unused length of the fiber optic cable 40 can remain coiled on the drum portion of the spool arrangement 136 for storage within the housing 131 of the fiber distribution terminal 130.

FIGS. 6-13 show another fiber distribution terminal 230 that is another example of a configuration for the fiber distribution terminals 30 of FIG. 1. The fiber distribution terminal 230 has similar structure as the fiber distribution terminal 130, but has been modified to have a configuration that allows at least the drum portion of the spool arrangement to be removed from a front portion of the housing after deployment of the fiber distribution terminal. In this way, excess fiber optic cable 40 on the drum portion can be stored at a location offset from (i.e., remote from) the front portion of the fiber distribution terminal 230. This allows the front portion of the terminal housing (which can contain, e.g., an optical splitter, an optical fan-out, fiber optic adapters, and connectorized fiber optic pigtails optically coupled to the fiber optic cable 40) to have a relatively compact configuration after deployment.

The fiber distribution terminal 230 includes a housing 231 having an intermediate housing body 233 (i.e., a main housing body), a front cover 234 and a rear cover 235. The front cover 234 is movable (e.g., pivotally moveable) relative to the intermediate housing body 233 between an open position and a closed position. The rear cover 235 is removable from the housing body 233 (see FIGS. 6, 7, 10 and 11). The housing body 233 and the front cover 234 cooperate to define a front compartment 237 (see FIG. 12) of the fiber distribution terminal 230. The housing body 233 and the rear cover 235 cooperate to define a rear compartment 239 (see FIG. 12) of the fiber distribution terminal 230. The housing body 233 includes a rear wall 241 that divides the front compartment 237 from the rear compartment 239.

Figure 6:
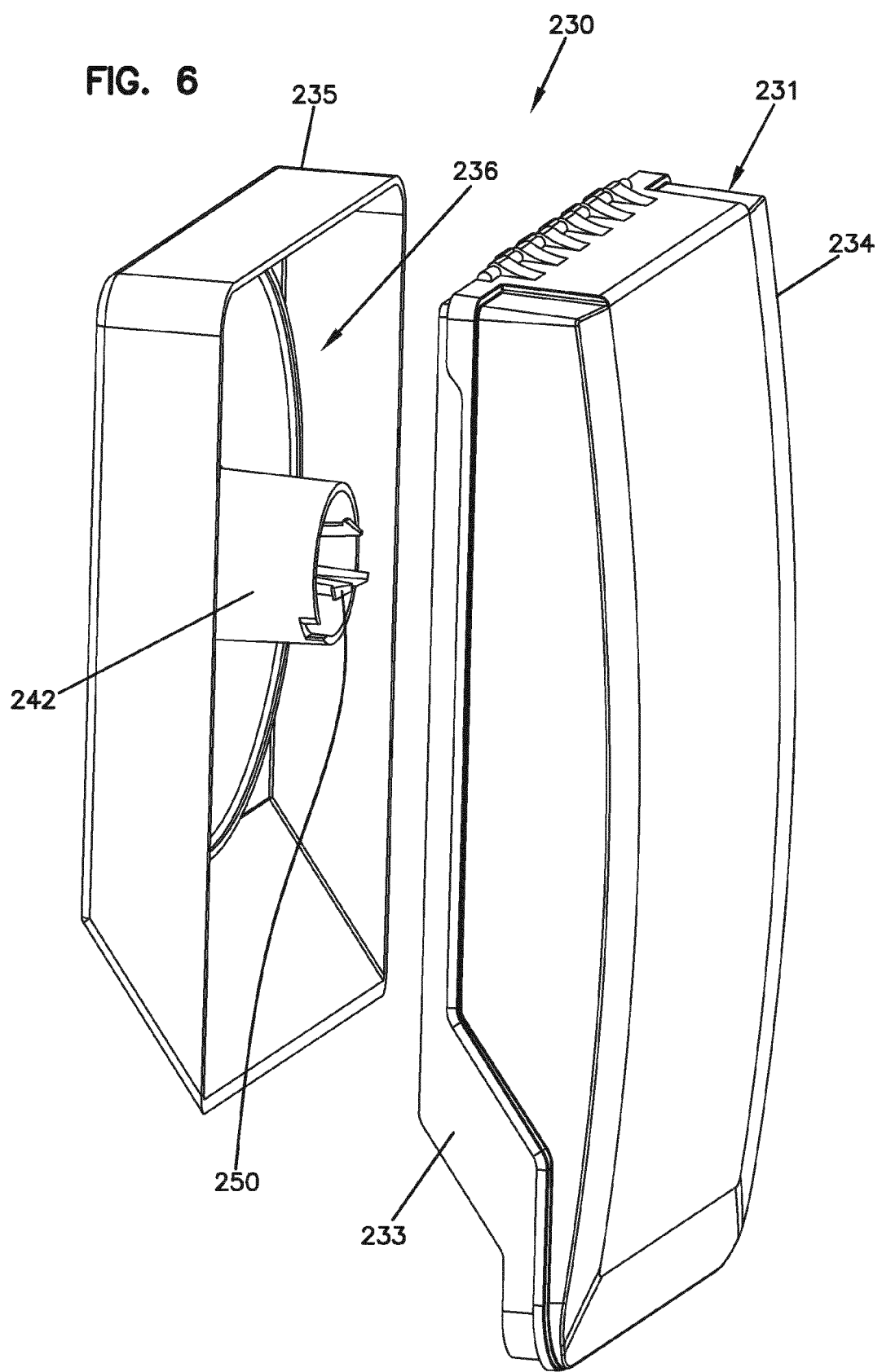
FIG. 6 is a front, perspective view of another fiber distribution terminal suitable for use in the fiber distribution system of FIG. 1 shown with a rear cover exploded from a housing.
Figure 7:
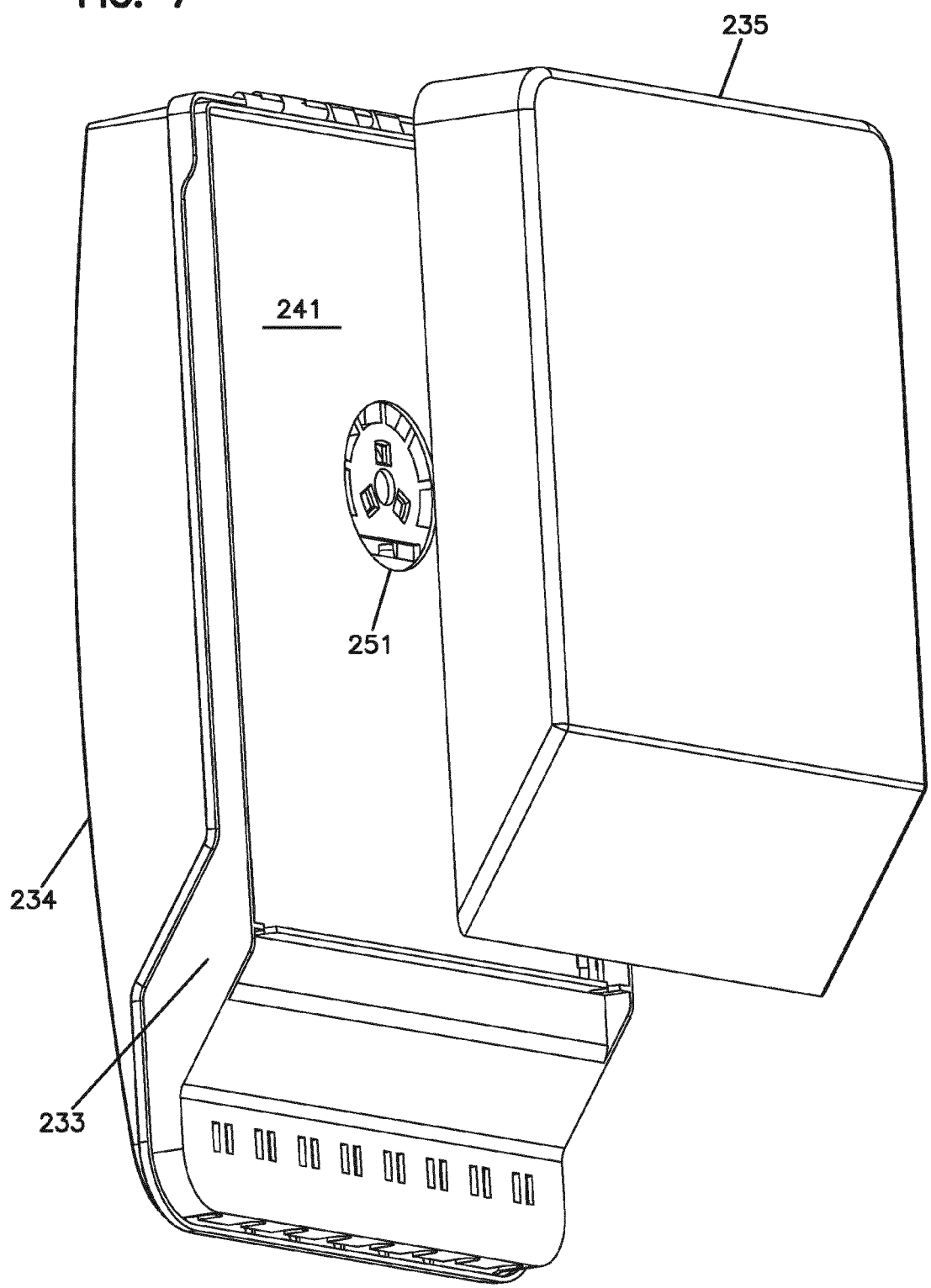
FIG. 7 is a rear, perspective view of the fiber distribution terminal of FIG. 6.
Figure 8:
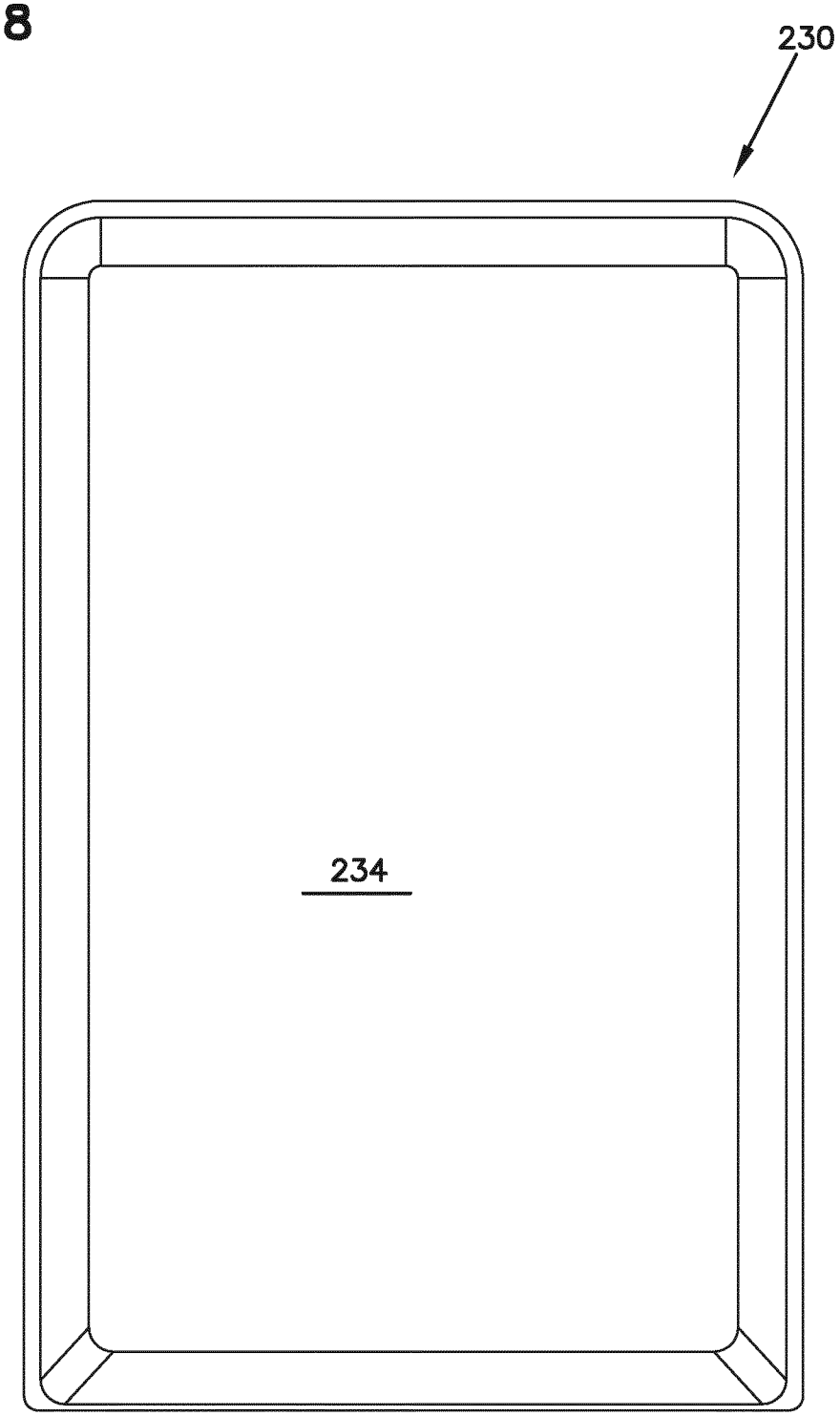
FIG. 8 is a front view of the fiber distribution terminal of FIGS. 6 and 7.
Figure 9:
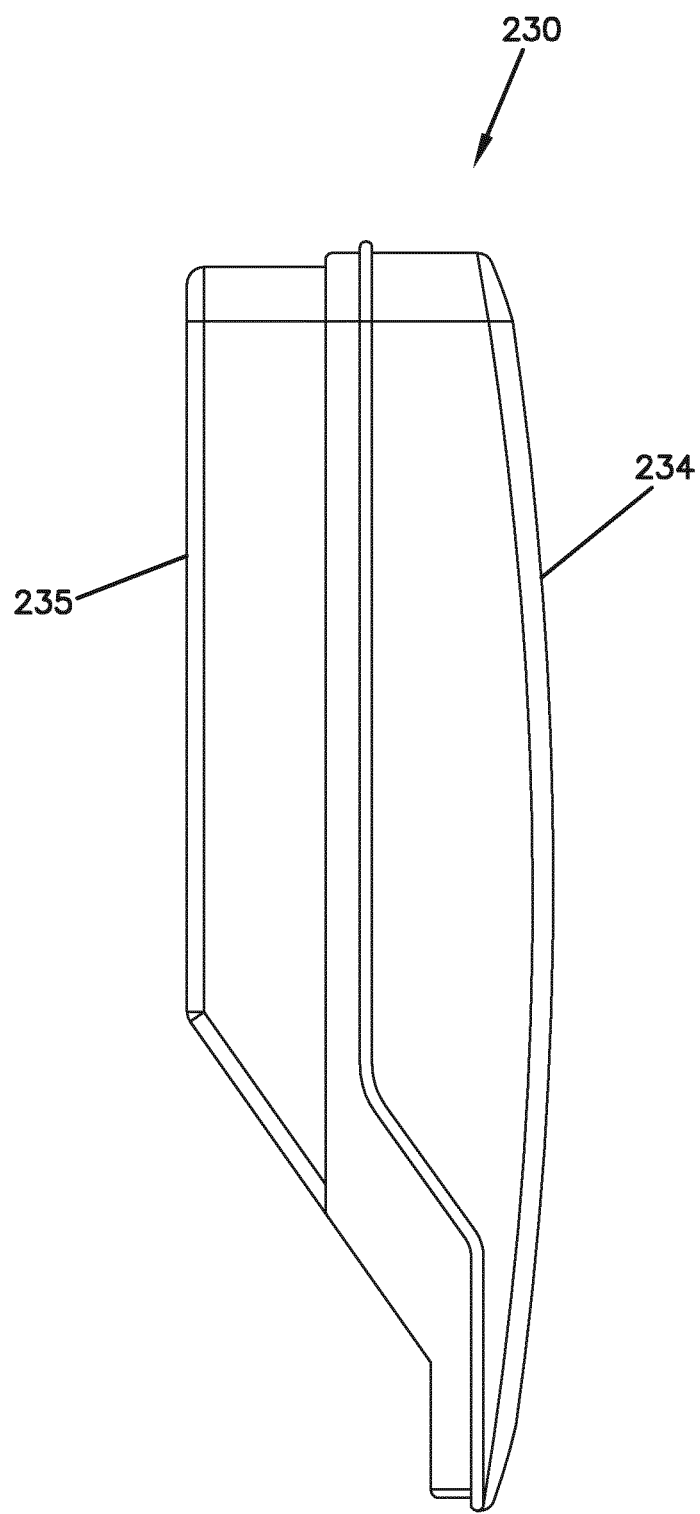
FIG. 9 is a side view of the fiber distribution terminal of FIG. 6 with the rear cover installed on the housing.
Figure 10:
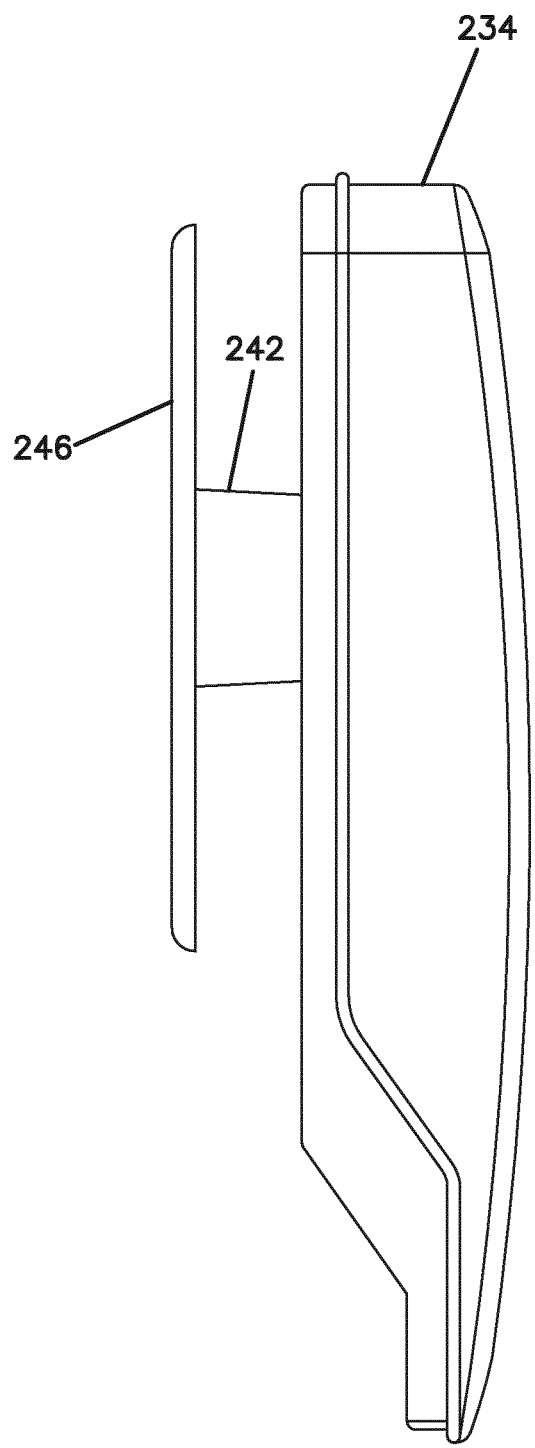
FIG. 10 is a side view of the fiber distribution terminal of FIG. 9 with the rear cover removed to expose a rear portion of a cable spool assembly.
Figure 11:
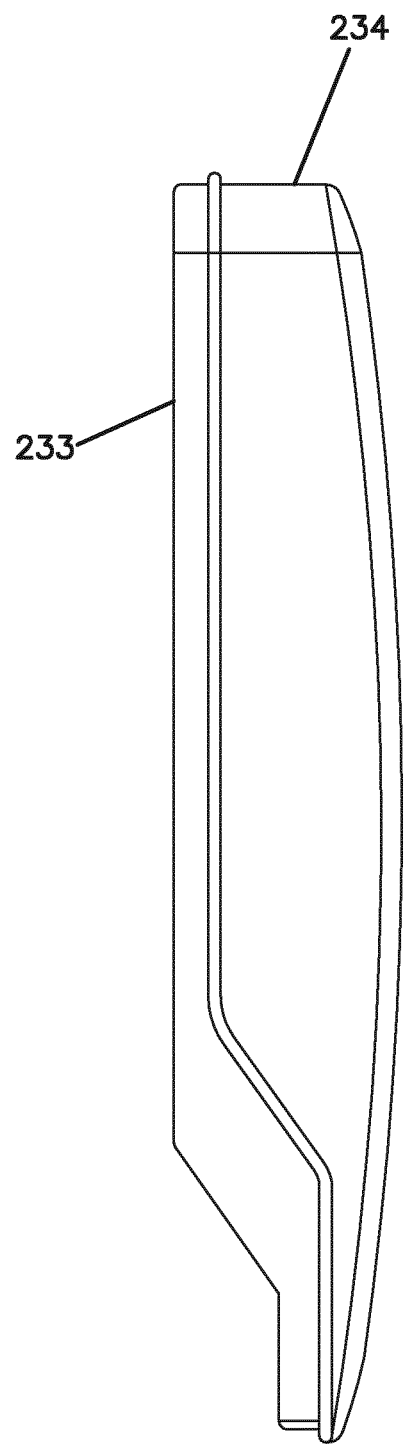
FIG. 11 is a side view of the fiber distribution terminal of FIG. 9 with the rear cover and the rear portion of the cable spool assembly removed.
Figure 12:
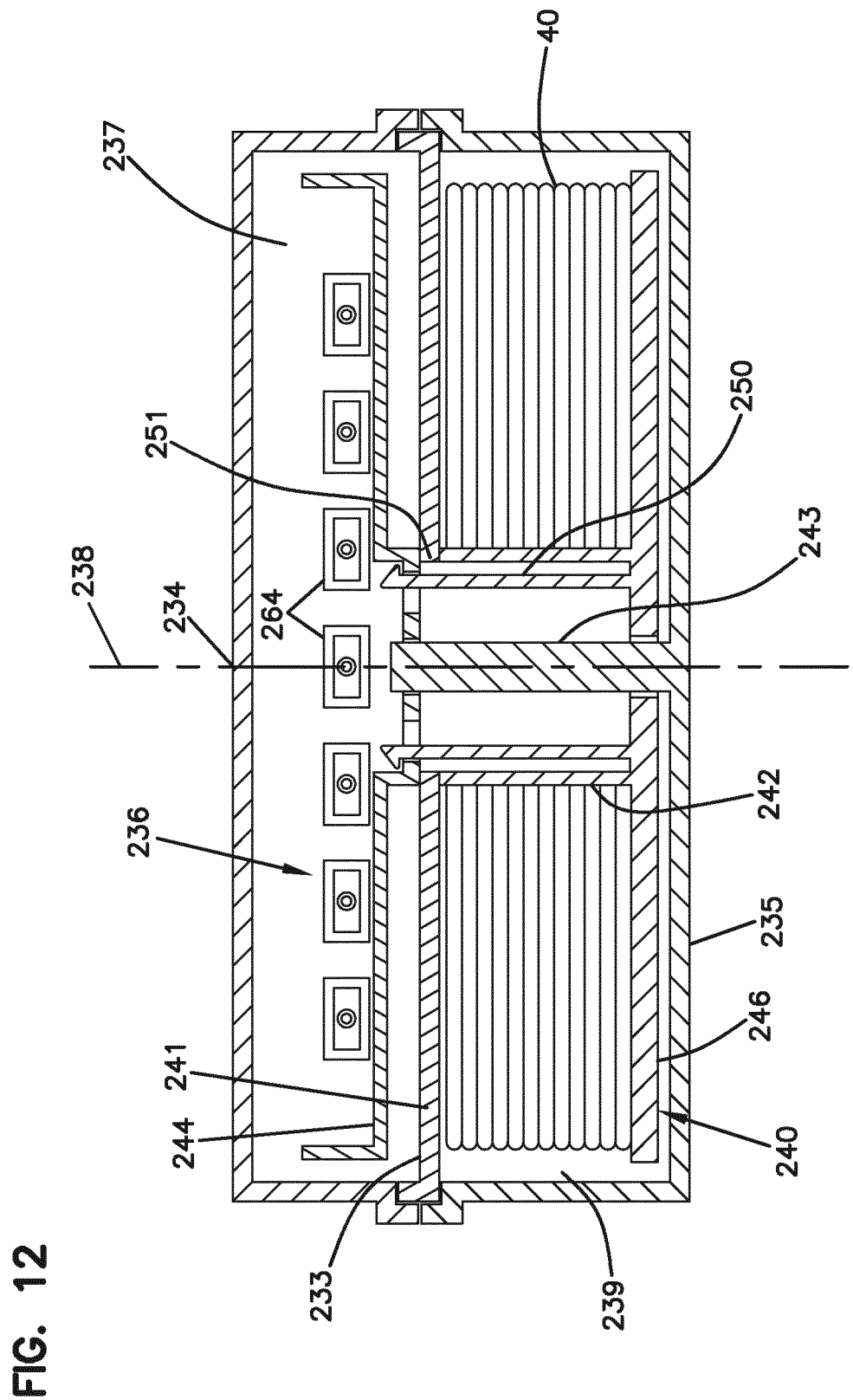
FIG. 12 is a cross-sectional view of the fiber distribution terminal of FIG. 9.

The fiber distribution terminal 230 also includes a spool arrangement 236 positioned within housing 231 (FIG. 6). The spool arrangement 236 can rotate relative to the housing 231 about an axis of rotation 238 (FIG. 12). The spool arrangement 236 can be rotatably mounted on a spindle 243 coupled to the rear cover 235 and aligned along an axis of rotation 238.

Referring to FIG. 12, the spool arrangement 236 includes a spool 240 having a drum portion 242 about which the fiber optic cable 40 is coiled. The spool arrangement 236 also includes a front flange 244 and a rear flange 246 between which the fiber optic cable 40 is coiled on the drum portion 242. The front and rear flanges 244, 246 are separated from one another along the axis of rotation 238. In the depicted example, the drum portion 242 is integrally formed with the rear flange 246 so as to form a one-piece part/unit. In the depicted example, the drum portion 242 and the rear flange 246 are coupled to the front flange 244 by a snap-fit connection. For example, flexible latches 250 are shown providing a snap-fit connection between the front flange 244 and the rear flange 246.

Referring still to FIG. 12, the rear flange 246, a majority of the drum portion 242 as well as the coiled portion of the fiber optic cable 40 are positioned within the rear compartment 239. The front flange 244 is positioned within the front compartment 237. The rear wall 241 of the housing body 233 defines an opening 251 through which the drum portion 242 extends to allow the drum portion 242 and the rear flange 246 to be coupled to the front flange 244 (See FIG. 7). The opening 251 also allows the fiber optic cable 40 to be routed from the rear compartment 239 to the front compartment 237.

Figure 13:
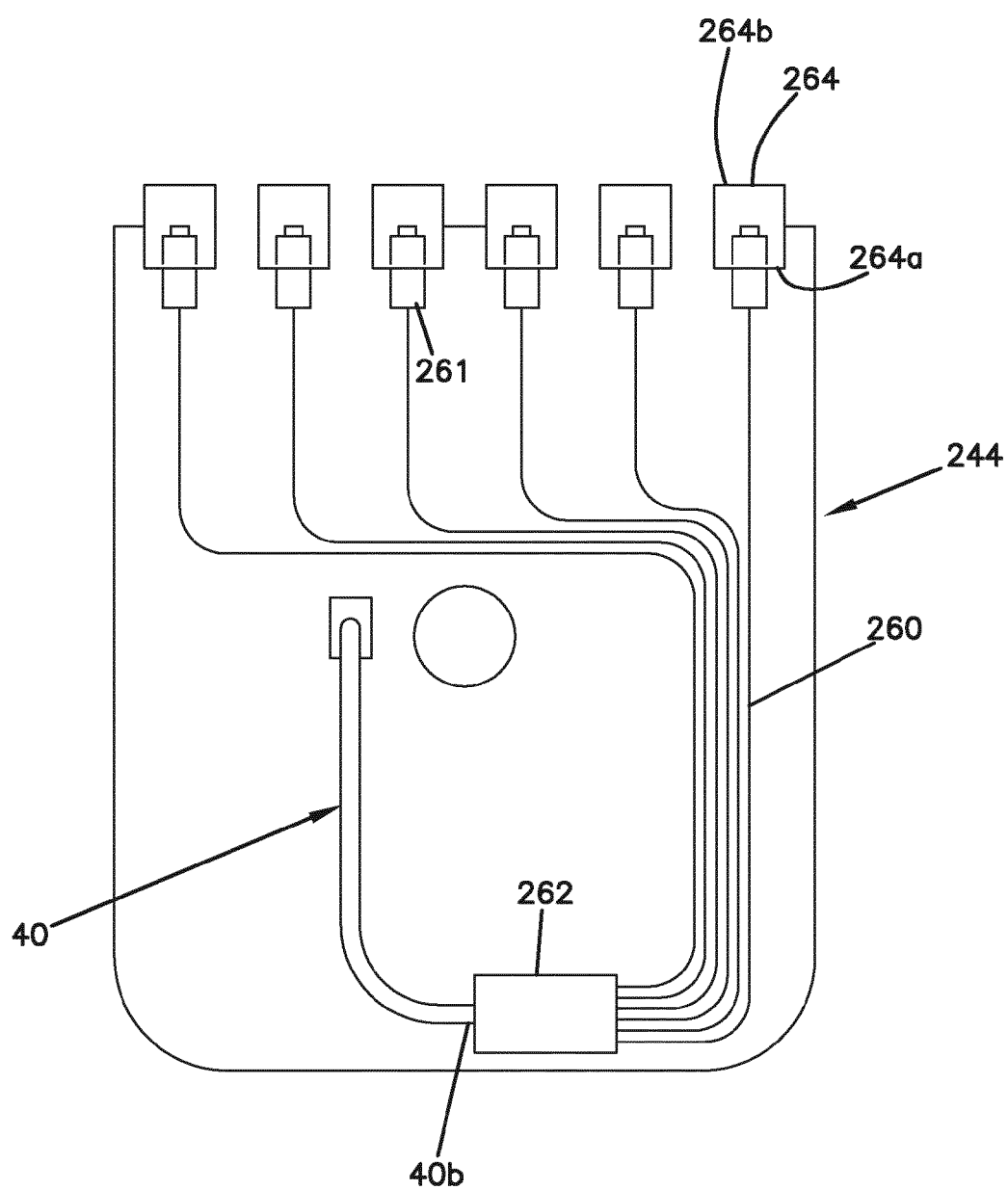
FIG. 13 is a plan view of a tray of the fiber distribution terminal of FIG. 9.

The first end 40a of the fiber optic cable 40 can be routed to the fiber distribution hub 20 for connection to the feed fiber 22. A second end 40b of the fiber optic cable 40 can be optically connected to a plurality of connectorized pigtails 260 via an optical splitter 262 (see FIG. 13). The front flange 244 can form a fiber management tray having fiber routing paths defined by one or more structures for providing fiber bend radius protection. A plurality of fiber optic adapters 264 can be supported on and carried by the front flange 244 within the front compartment 237. The fiber optic adapters 264 can each include first and second ports 264a, 264b. The splitter 262 can be supported on and carried by the front flange 244 within the front compartment 237 (FIG. 13). The connectorized pigtails 260 can have connectorized ends 261 received in the first ports 264a of the fiber optic adapters 264. The connectorized pigtails 260 can be routed along the front side of the front flange 244 from the splitter 262 to the fiber optic adapters 264.

To deploy the fiber distribution terminal 230, the terminal 230 is positioned at the desired floor 12b-12d and the fiber optic cable 40 is paid off from the spool arrangement 236 by pulling on the first end 40a of the fiber optic cable 40. The first end 40a of the fiber optic cable 40 is pulled down the riser 14 to the fiber distribution hub 20. As the fiber optic cable 40 is paid off from the spool arrangement 236, the spool arrangement 236 rotates relative to the housing 231 about the axis of rotation 238 defined by the spindle 243 coupled to the rear cover 235. The fiber optic adapters 264, the connectorized pigtails 260 and the optical splitter 262 are carried with the spool arrangement 236 and rotate in unison with (i.e., in concert with) the spool arrangement 236 about the axis of rotation 238 as the fiber optic cable 40 is paid off from the spool arrangement 236. After the cable 40 has been connected to the fiber distribution hub 20, the patch cords 50 can be used to connect the ONT's 60 to the fiber distribution terminal 230. For example, the first ends 50a of the patch cords 50 can be inserted into the second ports 264b of the fiber optic adapters 264.

After deployment of the fiber distribution terminal 230, any remaining unused length of the fiber optic cable 40 can remain coiled on the drum portion 242 of the spool arrangement 236. If it is desired for the distribution terminal 230 to have a compact configuration after deployment, the rear cover 235 can be detached from housing body 233 and the drum portion 242 and the rear flange 246 can be detached as a unit from the front flange 244 (e.g., by flexing the latches 250 inwardly). The front flange 244 with fiber optic adapters 264 and the connectorized pigtails 260 supported thereon remains in the front compartment 237. By removing the drum portion 242 and the rear flange 246 while the excess cable 40 remains coiled on the drum portion 242, the excess cable can be stored in a coiled configuration at a location offset from the front portion of the housing 231. For example, the excess cable can be stored in the riser, within a wall, or at another location. The excess cable can be tied/strapped in the coiled configuration and removed from the drum portion 242 for storage, or can be stored while remaining on the drum portion 242. In another example, the drum portion 242 can be detached from the rear flange 246. The intermediate housing body 233 and/or the front cover 234 can include structure (e.g., fastener openings, brackets, flanges, etc.) for mounting the front portion (i.e., the portion defining the front cavity 237) of the fiber distribution terminal 230 to a wall or other structure without the presence of the rear cover 235.

Various modifications and alterations of this disclosure will become apparent to those skilled in the art without departing from the scope and spirit of this disclosure, and it should be understood that the scope of this disclosure is not to be unduly limited to the illustrative examples set forth herein.

LIST OF REFERENCE NUMERALS AND CORRESPONDING FEATURES 10 fiber optic distribution system
12 multi-dwelling unit
12a-12d floors
14 a riser
20 fiber distribution hub
21 a service provider
22 feed fiber
24 a housing 24
26 optical splitters 26
30 fiber distribution terminals
40 fiber optic cables
40a, 40b first and second ends
50 patch cords 50a, 50b first and second connectorized ends
60 optical network terminals
130 fiber distribution terminal
131 a housing
132 a base
134 a front cover
136 spool arrangement
138 axis of rotation
139 spindle
140 spool
142 drum portion
144 front flange
146 rear flange
150 flexible latches
160 connectorized pigtails
161 connectorized ends
162 optical splitter
164 fiber optic adapters
164a, 164b first and second ports
230 fiber distribution terminal
231 housing
233 intermediate housing body
234 front cover
235 rear cover
236 spool arrangement
237 front compartment
238 axis of rotation
239 rear compartment
240 spool
241 rear wall
242 drum portion
243 spindle
244 front flange
246 rear flange
250 flexible latches
251 opening
260 connectorized pigtails
262 optical splitter
264 fiber optic adapters
264a, 264b first and second ports

What is claimed is:

1. A fiber distribution terminal comprising:
a housing, the housing including an intermediate housing body defining a rear wall, a front cover cooperating with the intermediate housing body to define a front compartment and a rear cover cooperating with the intermediate housing body to define a rear compartment;
a spool arrangement that can rotate relative to the housing about an axis of rotation, the spool arrangement including a drum portion centered on the axis of rotation and a flange that rotates with the drum portion about the axis of rotation;
a fiber optic adapter carried with the flange and positioned within the housing, the fiber optic adapter including first and second ports;
a connectorized pigtail carried with the flange and positioned within the housing;
a fiber optic cable coiled on the drum portion of the spool arrangement and optically connected to the connectorized pigtail; and
wherein the spool arrangement rotates relative to the housing when the fiber optic cable is paid out, and wherein the drum portion can be removed from the flange after the fiber optic cable has been paid out to provide the fiber distribution terminal with a compact configuration, wherein the rear cover is removed from the intermediate housing body to provide the fiber distribution terminal with the compact configuration.

2. The fiber distribution terminal of claim 1, wherein the flange is positioned in the front compartment and the coiled fiber optic cable is positioned in the rear compartment.

3. The fiber distribution terminal of claim 2, wherein a majority of the drum portion is contained in the rear compartment.

4. The fiber distribution terminal of claim 2, wherein the rear wall of the intermediate housing body defines an opening through which a portion of the drum portion extends.

5. The distribution terminal of claim 1, wherein the flange forms a fiber management tray including at least one fiber routing path.

6. The distribution terminal of claim 5, further comprising an optical splitter disposed in the fiber management tray.

7. The distribution terminal of claim 5, further comprising a fanout disposed in the fiber management tray.

8. The distribution terminal of claim 1, wherein the spool arrangement includes a second flange that is spaced along the drum portion from the flange.

9. The distribution terminal of claim 8, wherein the second flange is configured to be removed with the drum portion.

10. The distribution terminal of claim 9, wherein the drum portion is coupled to the flange by a snap-fit connection.

11. The distribution terminal of claim 1, wherein a plurality of fiber optic adapters are carried with the flange and positioned within the housing, the fiber optic adapters of the plurality each including first and second ports.

12. A method of deploying a fiber distribution terminal, the fiber distribution terminal including a spool arrangement coupled to a housing, the housing including an intermediate housing body defining a rear wall, a front cover cooperating with the intermediate housing body to define a front compartment and a rear cover cooperating with the intermediate housing body to define a rear compartment, the spool arrangement including a drum portion, the method comprising:
paying off a fiber optic cable from the spool arrangement by pulling on a first end of the fiber optic cable to rotate the spool arrangement and at least one adapter carried therewith;
detaching the drum portion from the housing by removing the rear cover from the intermediate housing body while any excess cable remains coiled on the drum portion to form a compact terminal; and
mounting the compact terminal at a mounting location.

13. The method of claim 12, wherein the drum portion and a rear flange are detached from the housing as a unit while a front flange of the spool arrangement remains attached to the housing.

14. The method of claim 12, further comprising mounting the drum portion and any excess cable to a second mounting location spaced from the first mounting location.

15. A fiber distribution terminal comprising:
a housing, the housing including an intermediate housing body defining a rear wall, a front cover cooperating with the intermediate housing body to define a front compartment and a rear cover cooperating with the intermediate housing body to define a rear compartment;
a spool arrangement that can rotate relative to the housing about an axis of rotation, the spool arrangement including a drum portion centered on the axis of rotation and a flange that rotates with the drum portion about the axis of rotation;

a plurality of fiber optic adapters, carried with the flange and positioned within the housing, the fiber optic adapters each including first and second ports;

connectorized pigtails carried with the flange and positioned within the housing;

a fiber optic cable coiled on the drum portion of the spool arrangement and optically connected to the connectorized pigtails through an optical splitter carried with the spool arrangement, the optical splitter having at least a 4 to 1 split ratio; and wherein the spool arrangement rotates relative to the housing when the fiber optic cable is paid out, wherein the rear cover is removed from the intermediate housing body to provide the fiber distribution terminal with a compact configuration.

* * * * *